United States Patent [19]

Caro

[11] 4,314,192
[45] Feb. 2, 1982

[54] ELECTRICAL POWER GENERATION APPARATUS AND METHOD UTILIZING ELECTRON BEAM DISCHARGE

[75] Inventor: Charles R. Caro, Florence, S.C.
[73] Assignee: CWM Corporation, Spruce Pine, N.C.
[21] Appl. No.: 90,132
[22] Filed: Nov. 1, 1979
[51] Int. Cl.³ .................. H01J 23/34; H02N 11/00
[52] U.S. Cl. .............................. 322/2 R; 307/151; 315/3; 315/5; 328/227
[58] Field of Search ............... 322/2 R; 328/227, 233; 307/151; 315/3.5, 5, 3

[56] References Cited

U.S. PATENT DOCUMENTS

| | | | |
|---|---|---|---|
| 2,288,694 | 7/1942 | Fry | 328/227 X |
| 2,706,248 | 4/1955 | Lindberg et al. | 328/227 |
| 3,089,079 | 5/1963 | Milligan | 322/2 |
| 3,316,439 | 4/1967 | Kluver | 315/3 X |
| 3,360,663 | 12/1967 | Crewe et al. | 322/2 X |
| 3,462,636 | 8/1969 | Seunik et al. | 315/3 |
| 3,886,399 | 5/1975 | Symons | 307/151 X |

Primary Examiner—Robert J. Hickey

[57] ABSTRACT

An apparatus and a method for generating electrical current in which electron beams are discharged through a succession of elongate electron beam channels arranged in a parallel array while a magnetic field is imposed on the array with flux directed perpendicularly to the longitudinal axes of the channels. Beams are directed successively through channels spaced one from another in a direction generally perpendicularly to both the axes of the channels and the magnetic flux. Electrical energy for operating the apparatus is derived from a suitable low current source such as a photovoltaic or solar cell.

22 Claims, 10 Drawing Figures

_Fig-5_  _Fig-6_

_Fig-7_  _Fig-8_

Fig-9

ELECTRICAL POWER GENERATION APPARATUS AND METHOD UTILIZING ELECTRON BEAM DISCHARGE

FIELD AND BACKGROUND OF INVENTION

Methods and apparatus for generating electrical power have formed the basis of important energy systems for some time and have, accordingly, been the subject of relatively extensive study. Persons skilled in the arts of electrical power generation and use are familiar with a variety of ways in which electrical power is generated, transformed, converted and used.

Electrical power has been generated as a result of electrochemical effects, photovoltaic effects, and electrodynamic effects. Electrodynamics, in the most generally known form, deals with the flow of electricity in conductors. Using an analysis based on electrodynamics, the operating principle of a conventional generator is traditionally illustrated by a rotating loop of conductive material positioned so that the axis about which the loop rotates is perpendicular to the lines of flux of a magnetic field. Upon rotation, the conductor "cuts" the magnetic flux lines and the amount of magnetic flux passing through the plane of the rotating loop of wire varies periodically from zero to a maximum value, as the plane of the loop successively passes through positions parallel and perpendicular to the magnetic flux lines. Electrical current thus generated may be collected by means of slip rings (in the case of an alternating current generator) or by a commutator (in the case of a pulsating direct current).

It is known, in the construction and use of certain electrodynamic apparatus, to provide a mechanical prime mover such as a turbine for driving the electrodynamic devices, a relatively low power dynamoelectric apparatus for generating a "tickler" or "exciter" voltage, and a larger electrodynamic apparatus as a main generator. Such electrodynamic apparatus has been widely successful and has been the base upon which current usage of electrical powder has been built.

As mechanical designers appreciate, however, the rotational speeds at which such electrodynamic apparatus are capable of operating are somewhat limited, particularly where acceleration and deceleration are required or encountered. Thus, limitations upon the operation of such mechanically driven electrodynamic apparatus have been established by the mechanical limitations of the structures used.

BRIEF DESCRIPTION OF INVENTION

With the above discussion in mind, it is an object of the present invention to accomplish the generation of electrical power while avoiding the design limitations heretofore imposed by mechanical characteristics such as static and dynamic balance and moments of inertia. In realizing this object of the present invention, an electrodynamic apparatus comprises an arrangement for the discharge of electron beams and including a plurality of deflection, emission and target electrodes defining a parallel array of elongate electron beam channels. By means of the imposition of a magnetic field on the array of channels with flux perpendicular to the longitudinal axes of the channels and the sequential discharge of electron beams through a succession of the channels while successive beams are directed through channels spaced one from another in a direction generally perpendicular to both the axes and the flux, electrical power is generated while avoiding certain of the mechanical limitations heretofore encountered.

Yet a further object of the present invention is to provide an electrical current generating apparatus which combines an electrical energy source for supplying an exciter or tickler electrical current with an electron beam discharge arrangement as briefly described hereinabove and with appropriate convertors for delivering electrical power in a desired form. Preferably, the electron beam discharge apparatus has a plurality of juxtaposed sheets of electrically insulating material stacked in a predetermined array with the electrodes disposed among the stacked sheets and spaced thereby one from another for defining a channel array.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described hereinafter with more particular reference to the accompanying drawings in which an embodiment of the present invention which is preferred at the time of writing of this description is illustrated, it is to be understood at the outset of the description which follows that persons skilled in the applicable arts will be able to depart from the specific apparatus now to be described while still incorporating the features of the present invention. Accordingly, the description which follows is to be read broadly as an enabling disclosure directed to persons of appropriate skill in the applicable arts, and not as limiting upon the scope of this invention.

Figure 1:
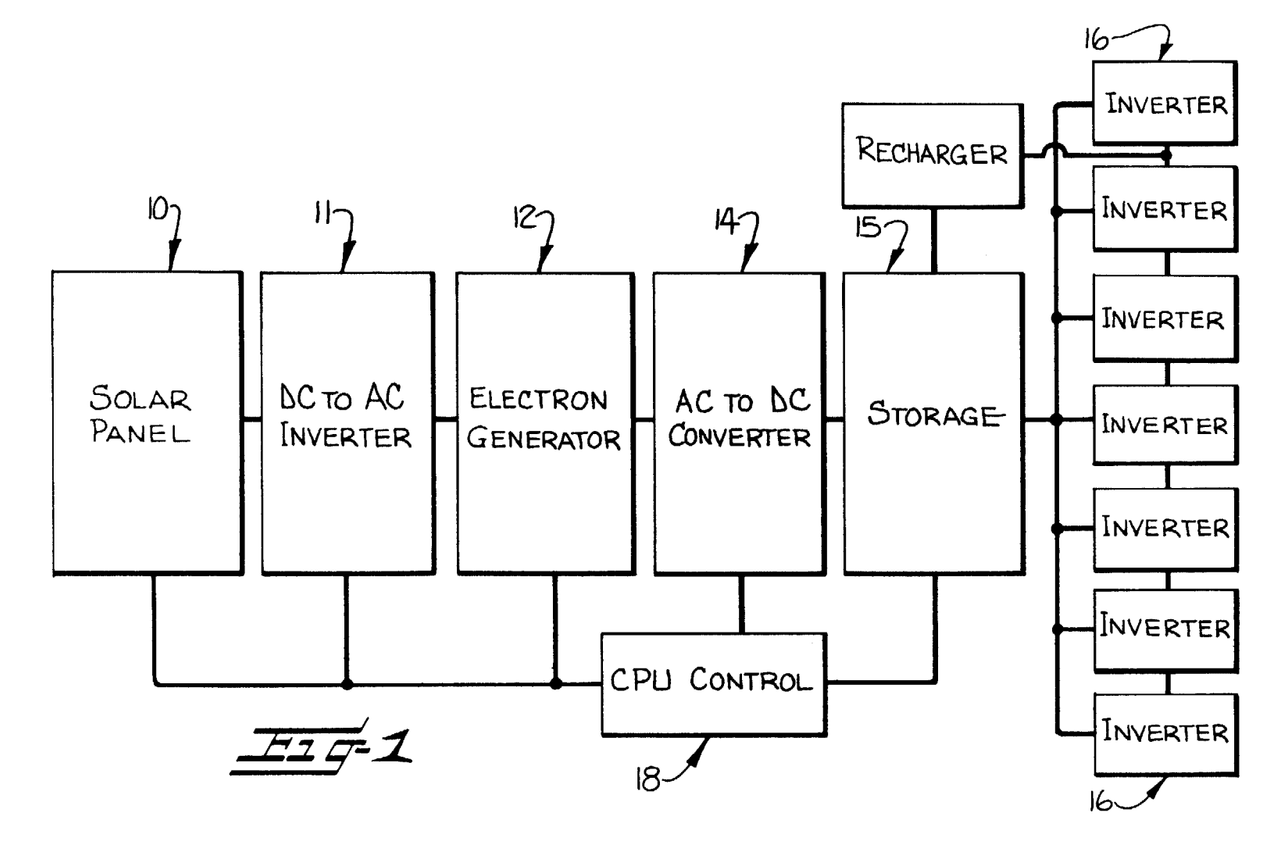
FIG. 1 is a schematic representation of an electrical current generating apparatus in accordance with the present invention.

Referring now more particularly to FIG. 1, an electrical current generating apparatus in accordance with the present invention has an electrical energy source means as generally indicated at 10 for supplying electrical current. Preferably, the source means supplies electrical current of relatively low power, on the order of one-thousandth of the power level desired as an ultimate output from the apparatus in accordance with the present invention. In operating embodiments of the present invention, the source means 10 has comprised a photovoltaic cell such as a solar panel of known and generally available type.

For purposes of driving an electrodynamic apparatus as will be described more fully hereinafter, the present invention contemplates the inclusion of an inverter, generally indicated at 11. The inverter may be of a type generally known to persons skilled in the applicable arts and commercially available, and will have the capability of receiving a direct current electrical power output from the source 10 and converting the output to an alternating current output. That alternating current output is delivered to an electrodynamic apparatus or generator generally indicated at 12, and to be described in greater detail hereinafter. Electrical power generated by the electrodynamic apparatus 12 is, in turn, supplied to an alternating current to direct current converter generally indicated at 14. Again, the converter 14 may be of a generally known and commercially available type. Direct current electrical power delivered through the converter 14 may be received by appropriate storage means generally indicated at 15, in the form of an appropriate battery of electrochemical cells. Such a storage battery may, through appropriate inverter circuits generally indicated at 16, be connected with appropriate loads.

As generally indicated in FIG. 1, the various components of the electrical current generating apparatus of the present invention are operatively connected with and controlled by a central processing unit (CPU) control generally indicated at 18. The CPU control 18 preferably takes the form of an appropriate microprocessor of types known to persons skilled in the applicable arts and capable of being programmed for control functions as described more fully hereinafter.

Figure 2:
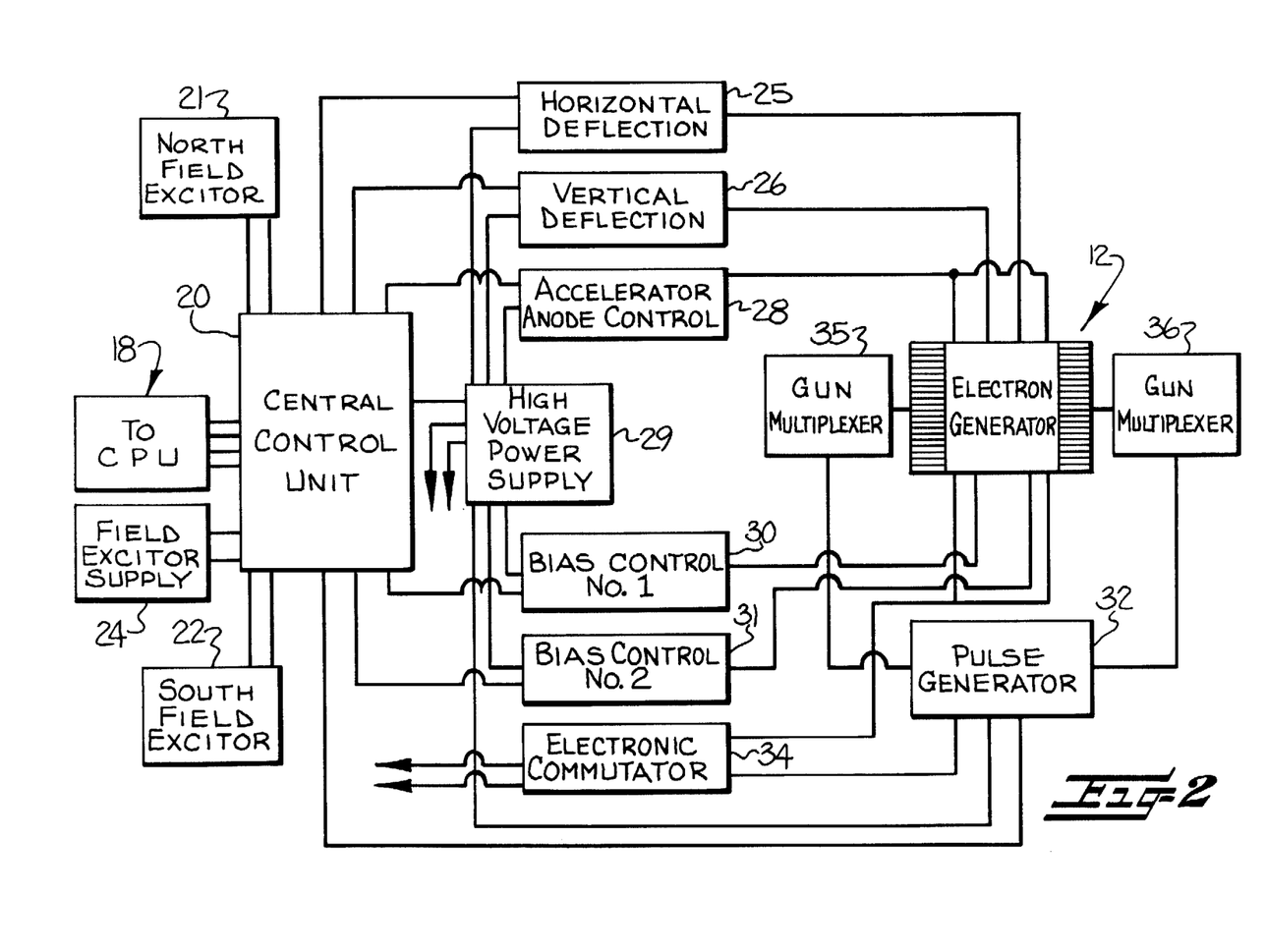
FIG. 2 is a partly schematic representation of portions of the apparatus of FIG. 1, more particularly defining certain apparatus elements.

Referring now more particularly to FIG. 2, the electrodynamic apparatus 12 may be viewed as including a number of more specifically defined elements. More particularly, the apparatus includes electron beam discharge means for directing electron beams and including a plurality of deflection, emission and target electrodes to be more specifically described hereinafter. The electrodes cooperate for defining a parallel array of elongate electron beam channels, each closed or occluded at one end by an emission electrode and at the opposite end by a target electrode. Magnetic field generating means are provided for imposing on the array a magnetic field having a flux directed perpendicularly to the longitudinal axes of the channels. Control circuit means are electrically connected with the electron beam discharge means for applying thereto voltage effective to sequentially discharge electron beams through a succession of the channels, while directing successive beams through channels spaced one from another in a direction generally perpendicular to both the axes and the flux. As will be more fully appreciated from the discussion which follows, the electrodynamic apparatus 12 includes a central control unit 20 operatively connected with the CPU control 18. The central control unit 20 additionally is connected with excitors or coils 21, 22 for a north magnetic field and a south magnetic field. Supply voltage for the field excitors 21, 22 is derived from a field exciter supply 24.

The electrodynamic apparatus 12 further includes horizontal deflection control circuits 25, vertical deflection control circuits 26 and accelerator control circuits 28. Each of the deflection and anode controls 25, 26, 28 is connected both with a high voltage power supply 29 and with the central control unit 20. First and second bias control circuits 30, 31 are also connected both with the high voltage power supply 29 and the central control unit 20. A pulsed generator 32 is connected with the high voltage power supply 29, the central control unit 20, and with an electronic commutator 34. The pulse generator controls, through gun multiplex circuits 35, 36 the specific channels through which electron beams are directed. By the cooperation of the elements schematically illustrated in FIG. 2, generation of electrical current as described more fully hereinafter occurs.

Figure 3:
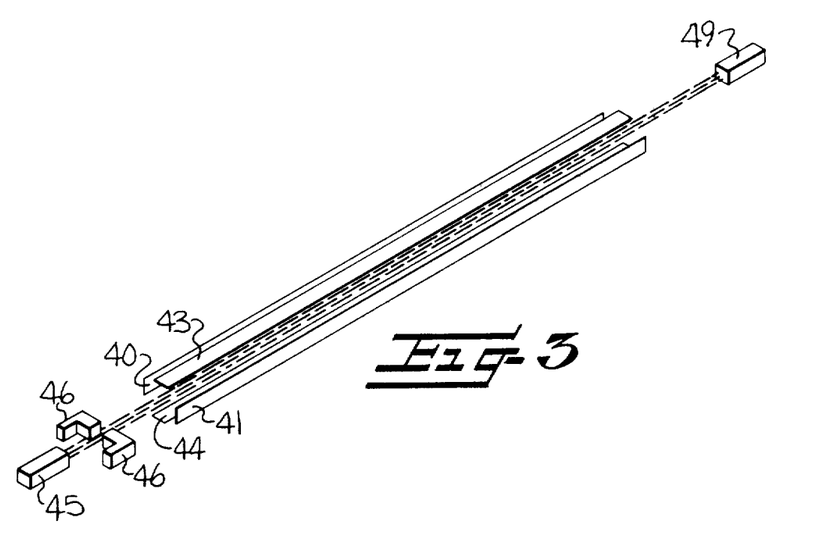
FIG. 3 is a somewhat schematic perspective view of one set of electrodes defining one elongate electron beam channel in accordance with the present invention.

The description which follows will be more readily understood by a first reference to FIG. 3 and the schematic perspective view there given of one channel for electron beam direction. More particularly, the channel is defined by a pair of horizontal deflection electrodes 40, 41 and by a pair of vertical deflection electrodes 43, 44. One end of the elongate electron beam channel thus defined is closed or occluded by an emission electrode 45 from which an electron beam (indicated in dash lines) issues. The electron beam passes between a pair of accelerator anodes 46. The electron beam impinges, at the opposite end of the elongate channel, against a target electrode 49.

Figure 4:
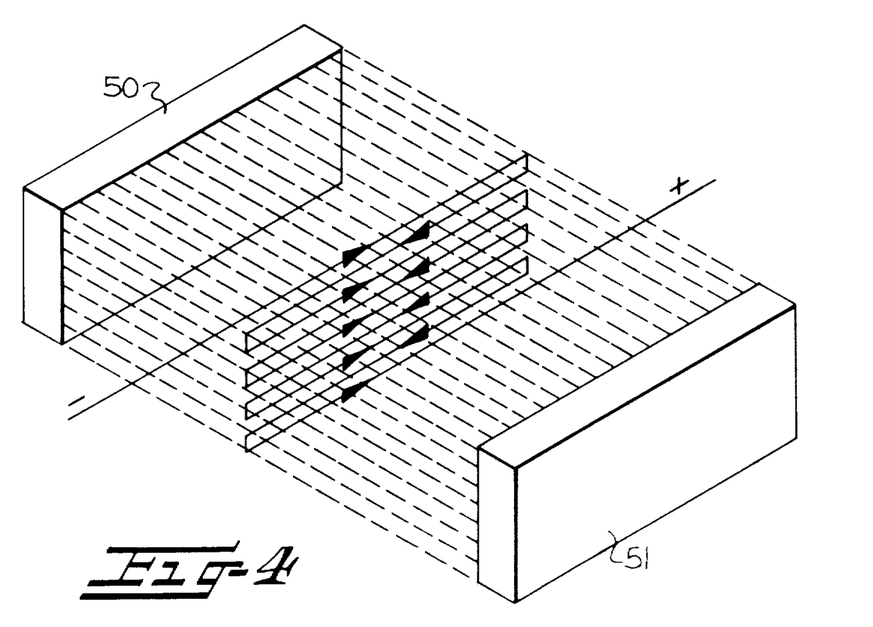
FIG. 4 is a schematic representation of a sequential discharge path for electron beams through a succession of channels in accordance with one mode of operation of the apparatus of the present invention.
Figure 5:
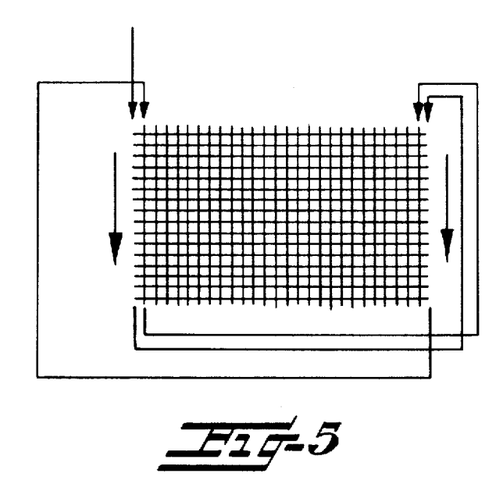
FIG. 5 is a somewhat schematic end view representation of an array of electron beam channels, particularly illustrating a sequence of discharge of electron beams leading to the generation of pulsating direct current.

As described more fully hereinafter, a plurality of such channels are arranged in a parallel array between north and south magnetic poles. One manner of operation of such a plurality of channels is schematically illustrated in FIG. 4, where the channels themselves are not shown. Instead, FIG. 4 includes first and second magnetic pole members 50, 51. As described above, the magnetic pole members 50, 51 are under the control of the field excitors 21, 22 and impose on an array of elongate electron beam channels therebetween a magnetic field having flux directed perpendicularly to the longitudinal axes of the channels. In one operating mode contemplated by the present invention, electron beams are directed through successive channels in a vertical array as indicated by solid, arrowed, lines. That is, in an uppermost channel, an electron beam is directed from left to right (in FIG. 4) from an emission electrode 45 to a target electrode 49. Immediately thereafter, and in an adjacent (shown as a next lower) channel, an electron beam is directed in the opposite direction (from right to left in FIG. 4) from an emission electrode to a target electrode. The directions of the beams emitted are indicated by arrows on the solid lines in FIG. 4.

Figure 6:
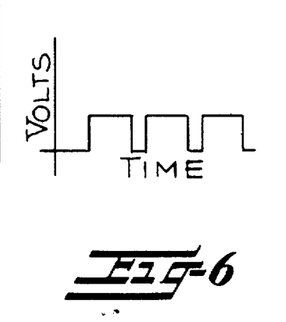
FIG. 6 is a diagram illustrating the nature of electrical power generated by an apparatus as illustrated in FIG. 5.

Certain of the modes in which electrical power may be generated as contemplated by the present invention will become more clear from an expansion of the showing of FIG. 4 as is to be found in FIGS. 5 through 8. In those figures, an array of elongate electron beam channels are shown in end view, as if the occluding emission and target electrodes were removed. For simplification, the magnetic field generating means has been omitted. Instead, lines are included to illustrate the manner in which electron beams are sequentially discharged through a succession of channels while being directed through channels spaced one from another in a direction generally perpendicular to both the axis of the channels and the flux. More particularly, in each of FIGS. 5 and 7, it may be assumed that the magnetic field generating means impose a magnetic field having flux directed generally from left to right through the cross-hatched schematic end view of the electron beam channels. When operated as suggested by FIGS. 5 and 6, successive beams are directed through channels from top toward the bottom of an array (as indicated at the left edge) and then from top toward the bottom of a separate "stack" of channels (as indicated at the right side of the array). The next succession of channels is displaced inwardly by one "column" or "stack" (as indicated toward the left margin of FIG. 5). Upon completing a sequence through such a succession of channels, a column toward the righthand side of the array is chosen. Such a sequence of successive beam discharges is generally indicated by the solid, arrowed, lines. When such a sequence is followed, the electrical power generated is of a fluctuating direct current type. As indicated in FIG. 6, where voltage of electrical power generated is plotted against time, the voltage generated fluctuates with time but is always fluctuating to the same side of a base or zero line.

Figure 7:
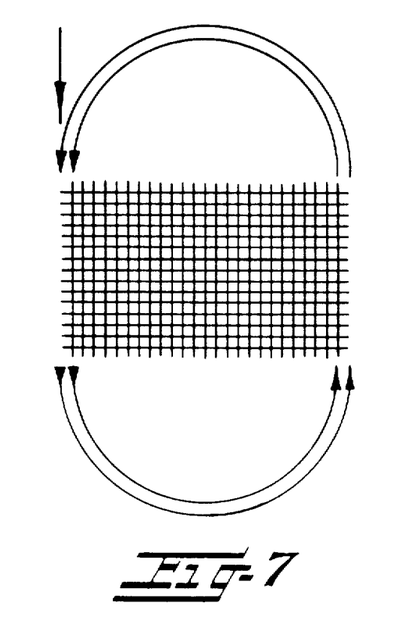
FIG. 7 is a view similar to FIG. 5, indicating a sequence of discharge of electron beams through a succession of channels leading to the generation of an electrical current.
Figure 8:
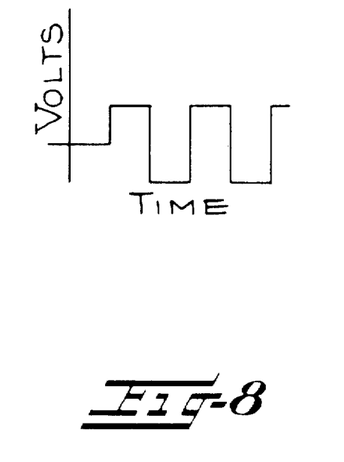
FIG. 8 is a view similar to FIG. 6, illustrating the wave form of electrical power generated by an apparatus as illustrated in FIG. 7.

Another mode of operation is illustrated in FIGS. 7 and 8, where generation of alternating current electrical power results. There, the succession is such that the sequential discharge moves through channels first in one direction across the magnetic field and then in the opposite direction across the magnetic field. Such motion in alternate directions across the magnetic field is to be distinguished from motion which is always in the same direction across the magnetic field, as has been described above. As is apparent from a consideration of the solid lines with directional arrows in FIG. 7, the resultant operation approaches the classical explanation of dynamo-electric generators as using a loop of metallic conductive material. As indicated in FIG. 8, the electrical power generated has voltage which varies up and down from an index or zero level.

The modes of operation illustrated and described with reference to FIGS. 5 through 8 are not the only modes of operation for which the apparatus and method of this invention can be adapted. Instead, it is recognized that the sequential discharge of electron beams through channels may use alternate channels or may be moved diagonally through an array. Other approaches to displacement of electron beams will be conceived by persons skilled in more conventional electrodynamic apparatus once an understanding of the present invention has been obtained. It is to be understood that, in accordance with the present invention, the sequentially discharged electron beams are passed through channels spaced one from another in a direction generally perpendicular to both the axis of the elongate channels and the magnetic flux imposed. It is this operation which gives rise to the "cutting" of magnetic flux which generates electrical power in accordance with the present invention. Voltage levels generated in any given succession of a limited number of electron beam discharges may be low. However, due to the significantly lower mass of the electron beam, as compared to a rotating loop of a metallic conductor, it is possible to "rotate" the electron beam at a significantly higher rate. As a consequence, the rate of flux cutting becomes such that significant electrical power is generated.

Figure 9:
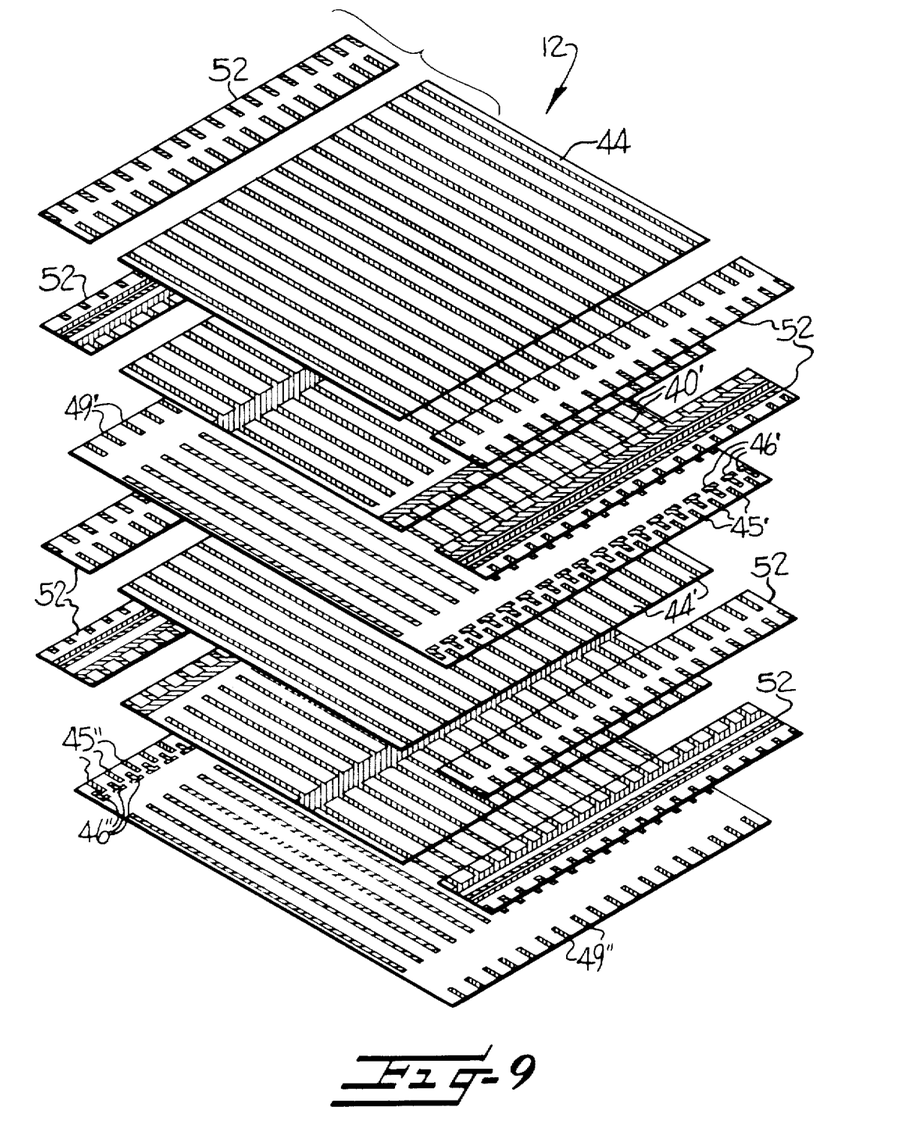
FIG. 9 is an exploded perspective view of a plurality of juxtaposed sheets of electrically insulating materials stacked in predetermined array for forming a portion of the electron beam discharge apparatus of the present invention.

Preferably, the electron beam discharge means in accordance with the present invention comprises a plurality of juxtaposed sheets of electrically insulating material stacked in predetermined array. The electrodes described hereinabove are disposed among the stacked sheets and spaced thereby one from another to define the beam channels. One form of such a construction is illustrated in FIG. 9, wherein a limited number of such stacked sheets are shown. As will be appreciated from the discussion which follows, a significantly greater number of sheets than those shown in FIG. 9 are typically used in order to provide an array packed with relatively high density. Further, the physical space required for each individual channel may be reduced. Stated differently, the sheets illustrated in FIG. 9 are in a scale chosen for clarity of illustration only, and not intended as indicative of the precise physical dimensions of an apparatus which operates in accordance with this invention.

Referring now more particularly to FIG. 9, the plurality of sheets there illustrated are arranged in such a manner as to illustrate the five different patterns of electrodes and connecting terminals which are used in assembling an apparatus in accordance with the present invention in a preferred form. Three of the patterns appear on relatively large sheets and primarily define the electron beam channels. Two of the patterns appear on smaller sheets which are used primarily to establish connections.

Referring now to the stack illustrated, the larger two uppermost sheets illustrate, on their uppermost and visible surfaces, two of the patterns employed. The concealed lower surface of the uppermost sheet bears a pattern identical to the visible uppermost surface of the second sheet from the top. The second sheet from the top bears, on its concealed lowermost surface, a pattern which is the same as that on the visible face of the uppermost sheet. Stated differently, the two larger sheets appearing uppermost in FIG. 9 are identical, with one sheet having one pattern facing upwardly (and visible) while the other sheet has the reversed pattern facing upwardly (and visible).

The third sheet from the top in the stack of FIG. 9 is of greater dimension and bears identical patterns on the upper (and visible) surface and on the lower (concealed) surface. The exploded portion of the stack illustrated in FIG. 9 includes two sets of such three sheets with the distinction being in the particular orientation of the third sheet from the top and the sixth sheet from the top (at the bottom of the exploded stack). Reference characters used in FIG. 3 to identify channel defining electrodes have been used in FIG. 9 to identify comparable elements, with the addition of single, double and triple prime notation to indicate elements cooperating in defining differing sets of channels.

In addition, the stack of FIG. 9 includes eight termination or connection strips 52, each of which is printed with a first pattern on one surface thereof and a second pattern on the other surface thereof. As will be apparent, the termination strips or sheets are arranged to expose to view both of these patterns.

Referring now more particularly to the uppermost large sheet, the visible surface of that sheet bears conductive elements defining vertical deflection electrodes. As is visible to the leftward end of the sheet second from the top in FIG. 9, conductive portions of the vertical deflection electrodes extend around the end portion of the sheet and are joined in a connective strip. The surface of the sheet bearing the connective strip for the vertical deflection electrodes additionally bears horizontal deflection electrodes and a connective strip therefor.

As will be appreciated, the greater dimensions of the sheets carrying the emission electrodes 45', 45" and target electrodes 49', 49" accomplish engagement of the end portions of those sheets with the immediately superposed termination or connection strips. The respective patterns provide for connective engagement with the emissions electrodes and with the target electrodes so as to provide for the connections necessary for the central control unit 20 to select the electrodes appropriate to a specific channel being used.

Figure 10:
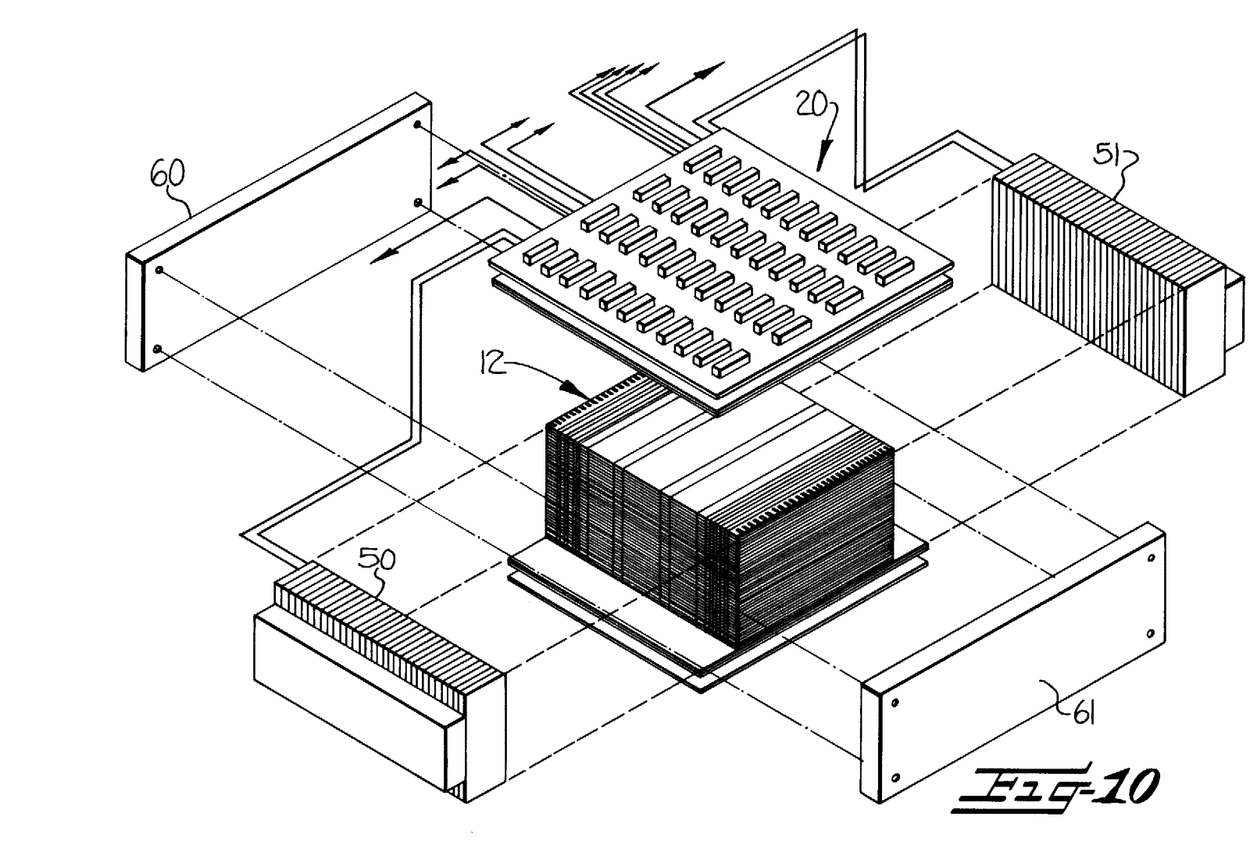
FIG. 10 is an exploded perspective view of portions of the electrodynamic apparatus of the present invention.

When a stack of sheets are assembled into the apparatus (FIG. 10) the array formed may include numbers of individual beam channels on the order of 5,000 or more. The channels are arranged in generally vertical columns, with adjacent columns extending in any desired grid formation. For example, the channels may be in columns of 50, with 100 columns formed each adjacent the others to define an array appearing, in end view, similar to those of FIGS. 5 and 7.

In one form contemplated by the present invention, the electrodes described hereinabove comprise conductive strips affixed to planar faces of the sheets. Persons familiar with the manufacture and assembly of printed circuit board electronic devices will be familiar with a number of ways in which such conductive strips may be affixed to the planar faces of sheets of electrically insulating material. It is contemplated by the present invention that any such known processes may be employed, depositing conductive material such as copper, silver or gold through printing, vacuum deposition, plating, etching, or other similar techniques. Such techniques may use substrates of mica, various resins or reinforced resin laminates, and other known materials.

It is further contemplated by the present invention that the sheets of electrically insulating material and the conductive elements defining electrodes may be formed in other known manners. More particularly, the technology of semiconductor manufacture has developed to such a point that it may well be possible to create sheets of electrically insulating semiconductive material having zones therewithin functioning as conductive portions defining electrodes in accordance with the present invention. Accordingly, the present invention specifically contemplates such modification of the particular form here described.

In assembling the apparatus in accordance with the present invention, a substantial number of sheets as described hereinabove with reference to FIG. 9 are prepared and are then stacked to form an array of channels. As assembled, the apparatus comprising the plurality of sheets generally has the appearance of a block encircled by conductive bands electrically connected with the various electrode structures within the block and permitting selection of those coordinated electrodes defining a channel and appropriate for the discharge of an electron beam in accordance with the present invention. To either side of the block of sheets are the magnetic pole structures 50, 51 which impose on the array of channels the magnetic field necessary for the generation of electrical power. The magnetic pole structures 50, 51 and the generating apparatus 12 are enclosed within an housing for vacuum encapsulation of the electron beam discharge means, inasmuch as such beams are more readily emitted and controlled under high vacuum conditions. Preferably, the housing means including end closure member 60, 61 illustrated in FIG. 9, is formed of a nonmagnetic or diamagnetic material effective as a radiation shield, such as relatively thick aluminum sheets. As indicated in FIG. 9, the control circuitry generally indicated at 20 for the generator may be mounted upon one of the portions of the housing means.

In an operating embodiment constructed in accordance with the present invention, conductive strips defining electrodes were formed on substrates of reinforced resin by printing copper and thereafter plating the printed copper. The substrate material was of sufficient characteristics and dielectric quality to provide insulation for a voltage differential of 15,000 volts and, in the operating embodiment, was high temperature Kapton. By way of example, the thickness of the conductive elements was 0.0127 inches, while the spacing of electrodes defining the channels was modularly based on a distance of 0.010 inches.

In the drawings and specification, there has been set forth a preferred embodiment of the invention, and although specific terms are employed, they are used in a generic and descriptive sense only and not for purposes of limitation.

That which is claimed is:

1. Electrodynamic apparatus comprising electron beam discharge means for directing electron beams and including a plurality of deflection, emission and target electrodes defining a parallel array of elongate electron beam channels each occluded at one end by an emission electrode and at the opposite end by a target electrode; magnetic field generating means for imposing on said array a magnetic field having flux lines directed perpendicularly to the longitudinal axes of said channels; and control circuit means electrically connected with said electron beam discharge means for applying thereto voltages effective to sequentially discharge electron beams through a succession of said channels while directing successive beams through channels spaced one from another within said magnetic field in a direction generally perpendicular to both said axes and said magnetic flux lines.

2. Electrical current generating apparatus comprising electrical energy source means for supplying electrical current; means electrically connected with said source means for converting electrical energy derived therefrom to high potential; electron beam discharge means electrically connected with said converting means and receiving high potential electrical energy for directing electron beams and including a plurality of deflection, emission and target electrodes defining a parallel array of elongate electron beam channels each occluded at one end by an emission electrode and at the opposite end by a target electrode; magnetic field generating means for imposing on said array a magnetic field having flux lines directed perpendicularly to the longitudinal axes of said channels; and control circuit means electrically connected with said converting means and said electron beam discharge means for applying high potential electrical energy to said electron beam discharge means to sequentially discharge electron beams through a succession of said channels while directing successive beams through channels spaced one from another within said magnetic field in a direction generally perpendicular to both said axes and said magnetic flux lines.

3. Apparatus according to one of claims 1 and 2 wherein said electron beam discharge means comprises a plurality of juxtaposed sheets of electrically insulating material stacked in predetermined array and further wherein said electrodes are disposed among said stacked sheets and spaced thereby one from another to define said channel array.

4. Apparatus according to claim 3 wherein said electrodes comprise conductive strips affixed to planar faces of said sheets.

5. Apparatus according to claim 3 wherein said electrodes comprise conductive strips extending on planar faces of spaced sheets for defining for each channel a pair of horizontal deflector electrodes.

6. Apparatus according to claim 3 wherein said electrodes comprise conductive strips extending in predetermined spaced relation on a common planar face of a corresponding sheet for defining for each channel a pair of vertical deflection electrodes.

7. Apparatus according to claim 3 wherein said electrodes comprise conductive strips extending in predetermined spaced relation on a common planar face of a corresponding sheet for defining for each channel a pair of accelerator electrodes.

8. Apparatus according to one of claims 1 and 2 wherein said control conduit means comprises processor means electrically connected to said electrodes for selecting sets of electrodes defining channels and for switching from set to set in predetermined sequence and at predetermined frequency.

9. Apparatus according to claim 8 wherein said processor means switches electron beam discharge from set to set of electrodes in a common direction perpendicular to both said axes and said flux so as to generate direct electrical current.

10. Apparatus according to claim 8 wherein said processor means switches electron beam discharge from set to set of electrodes in periodically alternating direction perpendicular to both said axes and said flux so as to generate alternating electrical current.

11. Apparatus according to one of claims 1 and 2 and further comprising housing means for vacuum encapsulation of said electron beam discharge means.

12. Apparatus according to claim 2 wherein said source means comprises means for supplying electrical current of relatively low power on the order of approximately one watt.

13. Apparatus according to claim 12 wherein said source means comprises a photovoltaic cell.

14. Apparatus according to claim 2 and further comprising output connector means electrically connected to said electron beam discharge means for receiving electrical current therefrom and for converting such electrical current to conventional voltage levels and frequencies.

15. A method of operating an electrodynamic apparatus comprising the steps of sequentially discharging electron beams through a succession of elongate electron beam channels arranged in a parallel array, while imposing on the array a magnetic field having flux lines directed perpendicularly to the longitudinal axes of the channels, and while directing successive beams through channels spaced one from another within said magnetic field in a direction generally perpendicular to both the axes of the channels and the magnetic flux lines.

16. A method of generating electrical current comprising the steps of supplying electrical energy from a source, converting the electrical energy to a high voltage, then sequentially discharging the electrical energy as electron beams through a succession of elongate electron beam channels arranged in a parallel array while imposing on the array a magnetic field having flux lines directed perpendicularly to the longitudinal axes of the channels and while directing successive beams through channels spaced one from another within said magnetic field in a direction generally perpendicular to both the axes of the channels and the magnetic flux lines, and commutating the electrical current generated by the flux cutting beams.

17. A method according to one of claims 15 and 16 wherein the step of discharging electron beams comprises emitting beams between accelerator electrodes formed by conductive strips deposited on planar faces of a plurality of juxtaposed sheets of electrically insulating material stacked in predetermined array, passing emitted beams between pairs of horizontal and vertical deflector electrodes similarly formed by conductive strips, and impinging emitted beams onto target electrodes similarly formed by conductive strips.

18. A method according to one of claims 15 and 16 wherein the step of directing successive beams through spaced channels comprises switching electron beam discharge from channel to channel in predetermined sequence and at predetermined frequency.

19. A method according to claim 18 wherein the step of switching displaces the electron beam discharge progressively in a common direction perpendicular to both said axes and said flux so as to generate direct electrical current.

20. A method according to claim 18 wherein the step of switching displaces the electron beam discharge progressively in periodically attenuating directions perpendicular to both said axes and said flux so as to generate alternating electrical current.

21. Electrodynamic apparatus comprising electron beam discharge means for directing electron beams and including a plurality of deflection, emission and target electrodes defining at least one elongate electron beam channel occluded at one end by an emission electrode and at the opposite end by a target electrode; magnetic field generating means for imposing on said at least one channel a magnetic field having flux lines directed perpendicular to the longitudinal axis of said at least one channel; and control circuit means electrically connected with said electron beam discharge means and with said magnetic field generating means for applying thereto voltages effective to discharge an electron beam through said at least one channel while effecting relative movement of said electron beam and said magnetic flux lines one to another within said magnetic field and in a direction generally perpendicular to both said longitudinal axis and said flux lines.

22. A method of operating an electrodynamic apparatus comprising the steps of discharging an electron beam through an elongate electron beam channel, while imposing on the channel a magnetic field having flux lines directed perpendicularly to the longitudinal axis of the channel, and while effecting relative movement between the electron beam within the magnetic field and the magnetic flux lines in a direction generally perpendicular to both the axis of the channel and the magnetic flux lines.

* * * * *